United States Patent [19]

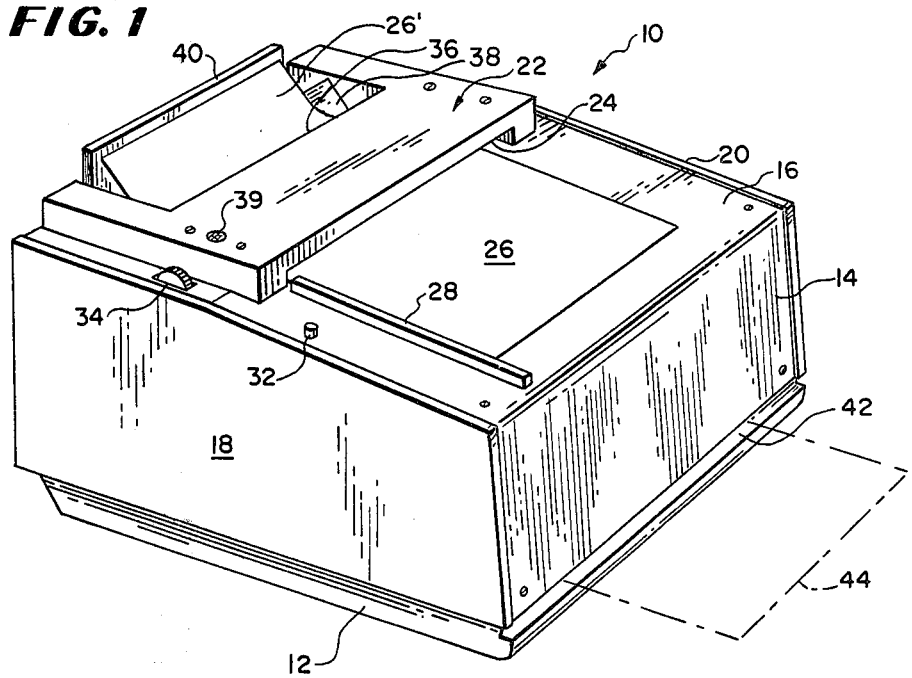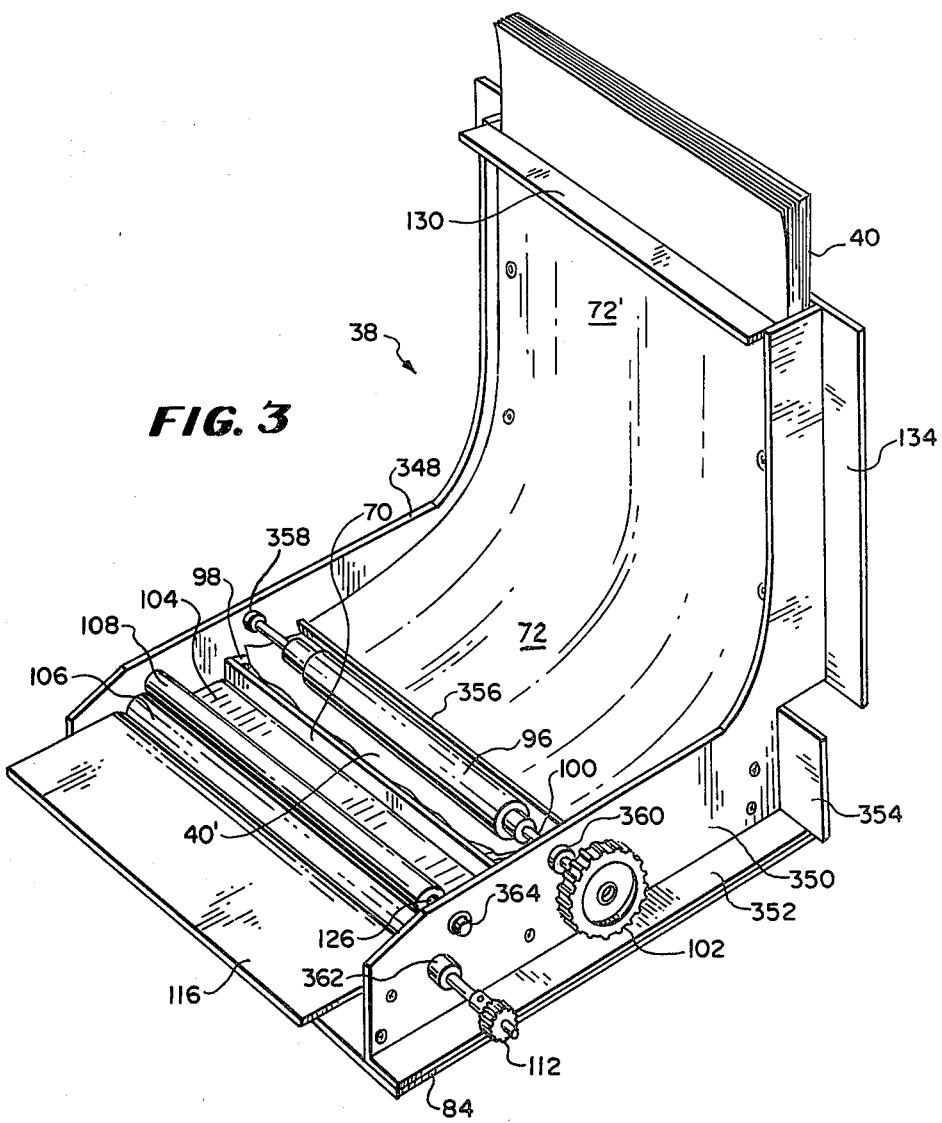

Hoffman

[11] 4,415,263
[45] Nov. 15, 1983

[54] ELECTROPHOTOGRAPHIC COPIER APPARATUS

[75] Inventor: Lionel B. Hoffman, Wyckoff, N.J.

[73] Assignee: Tetras S.A., Paris, France

[21] Appl. No.: 313,948

[22] Filed: Oct. 22, 1981

[51] Int. Cl.³ .............................................. G03G 15/00
[52] U.S. Cl. .................................... 355/3 SH; 355/3 R;
355/14 SH; 271/161; 271/188; 271/145; 271/149
[58] Field of Search .............. 355/3 R, 3 SH, 14 SH,
355/3 DR, 3 BE; 271/3.1, 4, 275, 264, 161, 225, 188, 212, 167, 145, 147, 149

[56] References Cited

U.S. PATENT DOCUMENTS

| 3,438,707 | 4/1969 | Hanson | 355/14 SH |
|---|---|---|---|
| 3,647,293 | 3/1972 | Queener | 355/15 |
| 3,779,638 | 12/1973 | Ravera et al. | 355/3 |
| 3,966,316 | 6/1976 | Pfeifer et al. | 355/3 |
| 3,991,998 | 11/1976 | Banz et al. | 271/167 X |
| 3,997,262 | 12/1976 | Doi et al. | 355/11 |
| 4,013,359 | 3/1977 | DuBois et al. | 355/16 |
| 4,025,180 | 5/1977 | Kurita et al. | 355/3 |
| 4,084,901 | 4/1978 | Aasen et al. | 355/16 |
| 4,279,504 | 7/1981 | Brown et al. | 355/3 SH X |
| 4,320,960 | 3/1982 | Ward et al. | 355/14 SH X |
| 4,332,458 | 6/1982 | Hoffman | 355/3 BE |
| 4,335,950 | 6/1982 | Gunzelmann et al. | 355/3 SH X |
| 4,350,436 | 9/1982 | Yagasaki et al. | 355/3 SH X |
| 4,376,577 | 3/1983 | Okamoto | 355/3 R X |
| 4,378,154 | 3/1983 | Hoffman | 355/3 R |

OTHER PUBLICATIONS

U.S. Patent Application Ser. No. 947,873, filed 10/02/78, now abandoned.

Primary Examiner—A. C. Prescott
Attorney, Agent, or Firm—Silverman, Cass & Singer, Ltd.

[57] ABSTRACT

Electrophotographic plain paper copier apparatus of a highly compact nature in which the copier is modular in construction and has a removable magazine to hold the paper supply in an arcuate disposition. A substantial number of the components and parts of components of the copier are located within the general quadrant subtended by the magazine thereby shortening the overall length of the copier. The copier features a removable master belt support, a compact projection system, the magazine mechanism and means to couple the same into the operating system of the copier and a novel illumination adjusting means.

49 Claims, 9 Drawing Figures

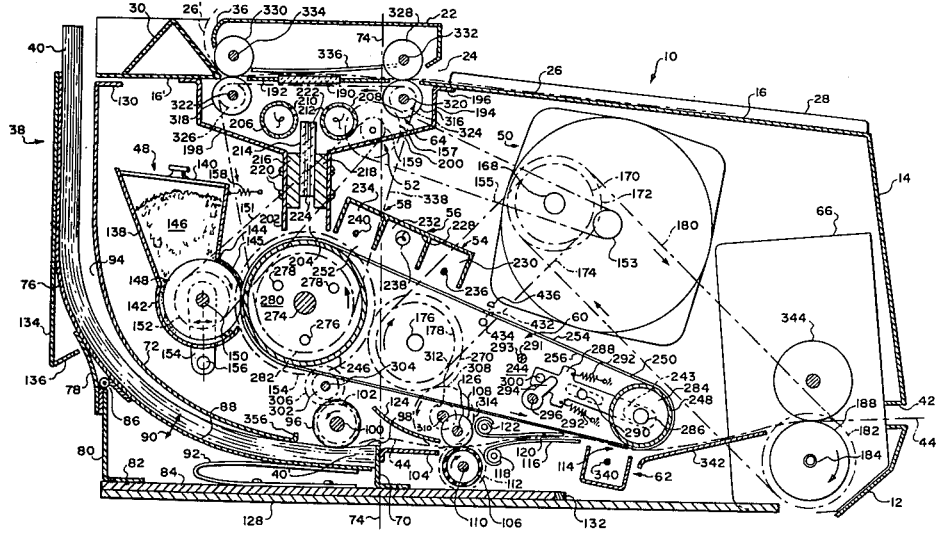

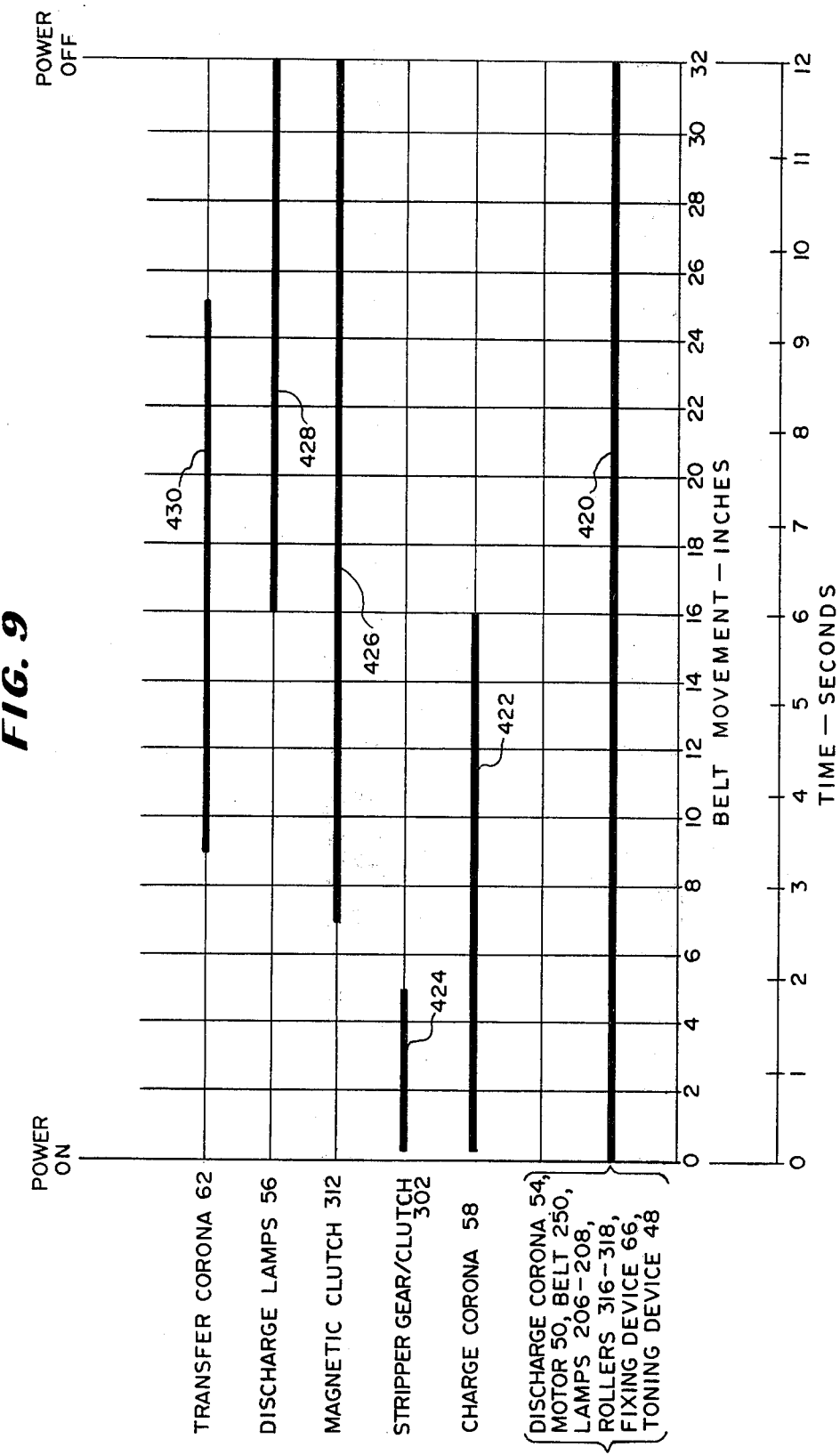

ELECTROPHOTOGRAPHIC COPIER APPARATUS

FIELD OF THE INVENTION

The field of the invention is plain paper copier apparatus of a compact type.

BACKGROUND OF THE INVENTION

There are many plain paper electrophotographic copiers commercially available at the present time and in addition the body of patented prior art which has evolved for the past decades since the original invention of Carlson is quite extensive. Basically all copiers of this type operate on the same principles.

The original document or graphic article is illuminated and the light image thereof projected onto a previously charged electrophotographic drum, belt or planar member to acquire a latent image of the subject matter carried by the document on the surface of the electrophotographic member. The electrophotographic member is developed by applying toner particles thereto, either in a liquid suspension or in dry powder form, these toner particles being electroscopic in nature and thereby being attracted to the incremental areas of the electrophotographic member which have not been discharged by the light of the projected image. The discharged areas of the electrophotographic member do not attract the particles.

The developed image is then transferred from the electrophotographic member to a plain paper sheet, the toner is fixed to the sheet by heat or pressure or both and the resulting copy of the original document is ejected from the apparatus.

The copier of the invention operates in the same manner as described, but the invention is concerned with structural features which render the copier of the invention highly compact, simple, economical, reliable, light weight and yet efficient.

The convenience copier, as it is known, has taken the form of large, heavy and expensive apparatus using considerable electrical energy for operation and utilizing for the most part an extremely complex operating system. It has been a long-desired goal of makers of convenience copiers to provide a plain paper copier that is compact and economical. The goal is not believed to have been achieved until the advent of this invention, at least to the extent that is accomplished by this invention.

One attempted scheme which has found its way into many commercial copiers has been to provide a carriage which moves the original document over the projection station requiring complex drive mechanisms along with additional motors besides those operating the other required mechanisms. Moving carriages require space to achieve the full stroke of the carriage that normally extends beyond the usual chassis of the apparatus. Different size paper requires different size cassettes which may even protrude from the chassis.

Considering the procedure which must be followed in a convenience plain paper copier, unless the paper follows a serpentine path to the electrophotographic drum or belt or other electrophotographic member, the mechanisms must be laid out end to end resulting in the minimum length being dictated by the mechanisms plus the length of the paper. The serpentine path type of copier is complex because the paper is required to be stripped off a magazine where sheets are stacked, brought to the transfer station by way of rollers, belt and guides while making turns, transferred, fixed and ejected. Jams are often and difficult to clear. Even servicing the usual copier is difficult because the desire to make the apparatus compact decreases the accessibility of the different parts of the interior of the apparatus.

Convenience copiers must be constructed with certain requirements to render them efficient and reliable. The basic ones of these requirements are concerned with the consumables of the apparatus. There is toner to be replaced, there is an electrophotographic member which becomes worn and/or fatigued which is to be replaced, there are belts or sprocket chains to be inspected and/or replaced, there is a supply of paper to be replenished, there is a projection system to be adjusted or focussed (usually in the finished apparatus before shipping), there may be illuminating means to be varied and there is always the requirement that a serviceman should be able to have ready and facile access to the mechanism and electrical system for servicing.

These requirements tend to make the copier complex. In addition copiers are made with mechanisms and electrical systems for making multiple copies, for enlarging or reducing the size of the copy relative to the original document, for making light or dark copies, for enabling books to be copied, etc.

The invention in its basic and preferred form contemplates a simple, compact copier which makes a single copy at a time from a sheet type original document that is manually fed to the device. For multiple copies, the original is re-fed into the apparatus, being available when the copy cycle is complete because it passes through the illuminating and projecting station immediately. No enlargement or reduction is provided for. All of the remainder of the requirements which are stated above are provided in a manner to render the copier compact and efficient. Although not limited thereto, the invention enables a convenience copier to be constructed which is about the size of a small typewriter and of comparable if not lesser weight.

SUMMARY OF THE INVENTION

A convenience copier is provided in which the paper is contained in a magazine which is arcuate in configuration, the paper being fed into engagement with a belt of electrophotographic material carrying a developed electrostatic image. The arc of the magazine is generally a quadrant of a cylinder and components of the copier including a toning device, the projecting and imaging means and a substantial portion of the master belt carrying frame are disposed in the quadrant subtended by the said arc as a result of which the copier is extremely compact because it is not limited by the size of the paper sheets. A novel magazine construction is provided, the magazine being removable whereby to give access to the interior of the apparatus.

A novel structure for mounting and removing the electrophotographic belt assembly from the copier is provided which is simple and effective.

Novel means for adjusting the light for illuminating the original document are provided, adjustable from exterior of the copier.

Other features of the copier include a highly effective and yet simple structure for feeding the original document to the projecting station.

BRIEF DESCRIPTION OF THE DRAWINGS

FIG. 1 is a perspective view of a convenience copier constructed according to the invention;

FIG. 3 is a perspective view of the paper supply magazine separated from the convenience copier;

FIG. 9 is a chart showing the timed relationship of the functions to one another.

DESCRIPTION OF THE PREFERRED EMBODIMENTS

Figure 2:
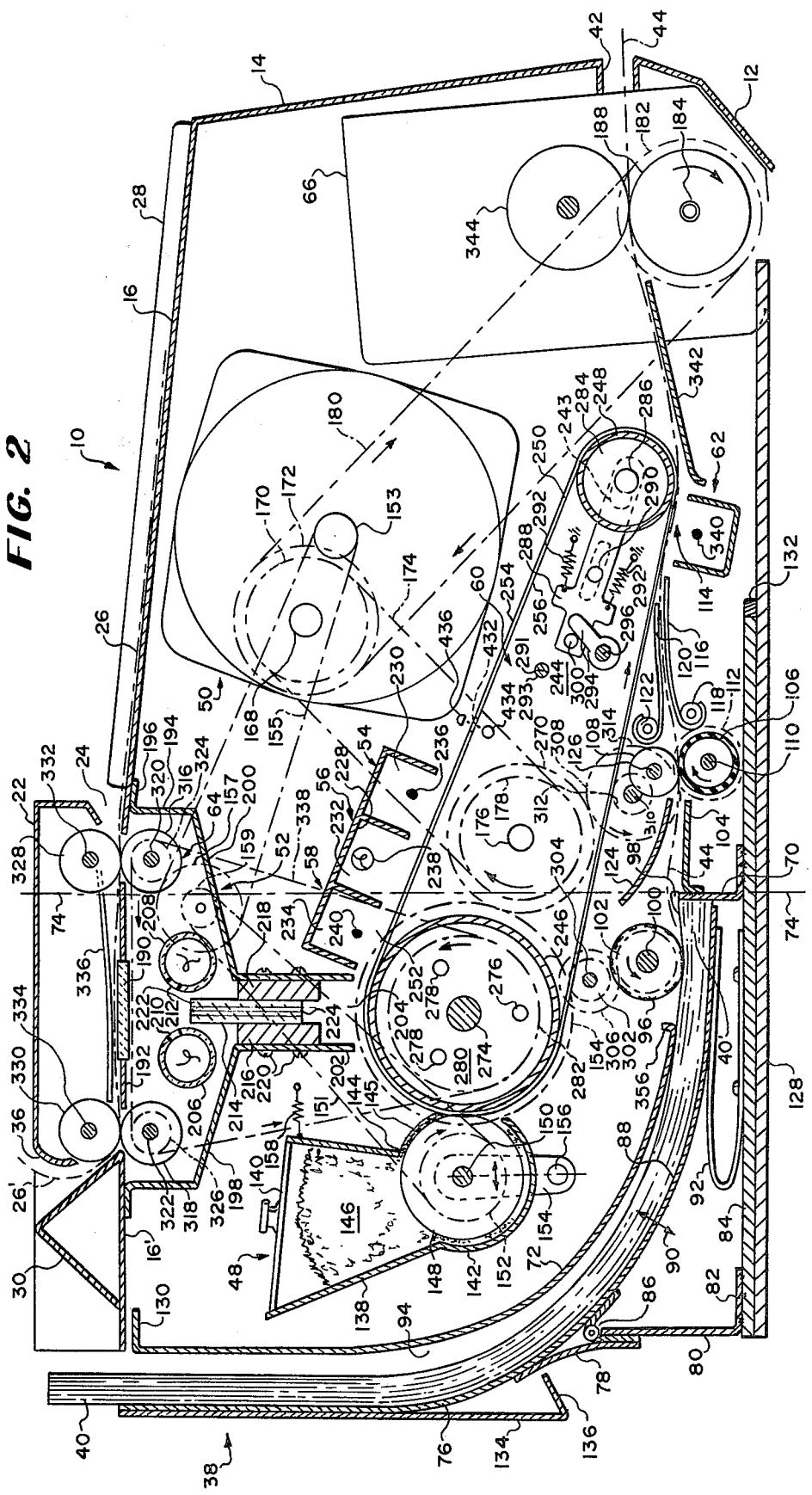
FIG. 2 is a generally median sectional view of the copier, front to back, with portions shown in elevation, the view being diagrammatic in many respects.

Generally the invention comprises the construction of a convenience copier in which the arrangement of principal components results in an apparatus which occupies very small volume but without crowding the components and without making access to the replenishment of consumables and servicing the machine difficult.

The combination of the invention comprises a magazine for the paper supply which is arcuate to form practically a quadrant of a cylinder, important components in the quadrant subtended by the magazine, the placement of the electrophotographic belt and the means for bringing a sheet of paper to the belt at a transfer station, all of which are geometrically arranged to decrease the length and height of the apparatus from what it would be without the combination.

The system of the copier also includes in combination an effective scheme for feeding the original document to the machine, illuminating and projecting it to the exposure station, a special toning mechanism, and novel drive means for the apparatus, all receiving their power from a single motor.

Other aspects of the invention will become apparent as this description proceeds.

In FIG. 1 there is illustrated in perspective a design for the exterior of the copier of the invention which is capable of considerable variation in appearance but which has certain structural aspects which are related to the invention. The copier is designated by the reference numeral 10 and will normally have an interior framework and/or chassis of structural steel from which the components and mechanisms including the motor, shafts, electronic circuit components and the like are hung or to which they are attached. The exterior may be formed of sheet metal members suitably shaped and/or fastened together or of synthetic resins molded or otherwise formed.

Figure 5:
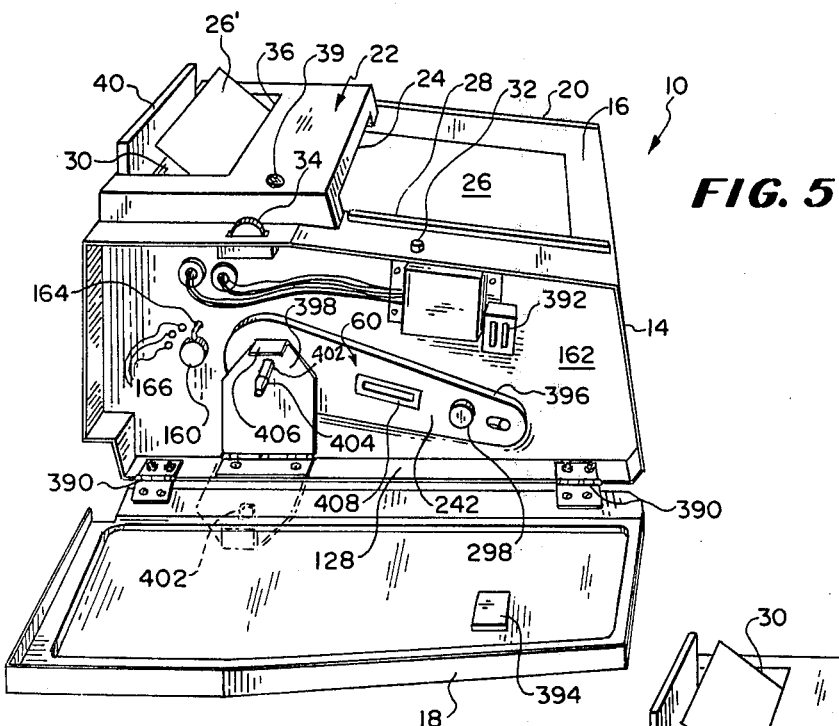
FIG. 5 is a perspective view of the convenience copier of the invention with the left side panel (considering that the right hand end in FIG. 5 is the front of the copier) pivoted to its opened condition.
Figure 6:
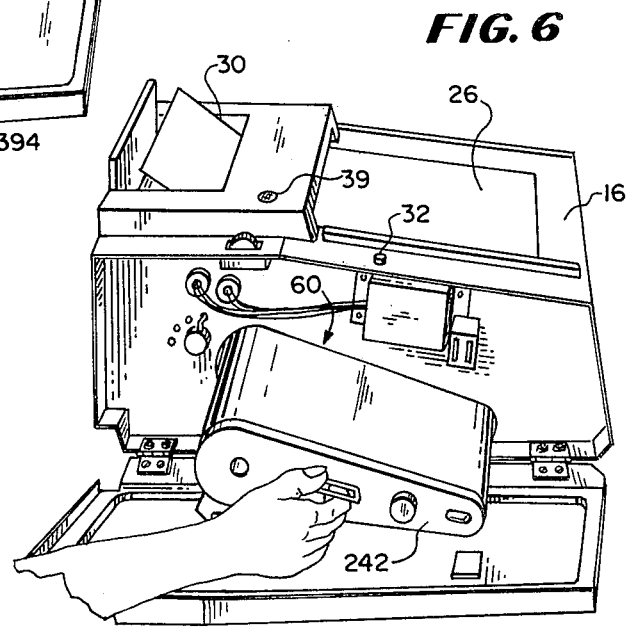
FIG. 6 is a view similar to that of FIG. 5 but showing the manner in which the electrophotographic belt or sleeve on its frame is capable of being removed from the copier.

Illustrated in FIG. 1 is a base 12, a front panel 14, a top panel 16, a hinged left side panel 18 which is capable of being pivoted to an open position as shown in FIGS. 5 and 6, a hinged right side panel 20 which pivots to an open position exactly like the panel 18 but which is not shown in the drawings, a light-blocking cover member 22 having a horizontal slot 24 to receive the original document shown at 26, an upstanding ledge or flange 28 for guiding one edge of the original document into the slot 24 and a deflector 30 for curling the original document upward and out of the copier after it has been illuminated and projected to enable the operator to remove it from the copier 10.

In a basic copier such as 10, the operator will see the original document 26' emerging and remove it before it drops onto the top of the housing. The invention does not exclude the provision of a simple basket or sheet metal platform supported on brackets from the top panel 16 to catch the emerging document 26'.

A starter button 32 is shown in the view, this being the only operating control needed to energize the copier for starting the cycle to perform its functions. A light adjusting thumb wheel 34 is shown protruding from the top panel 16 alongside of the cover member 22. The cover member 22 has a large U-shaped recess 36 at its back end to accommodate the deflector 30 and the paper supply magazine 38 (FIG. 3), only the paper supply 40 itself being visible in FIG. 1. There is a jewel 39 on the cover member which is illuminated by the lamps that illuminate the document and which tells the operator that a cycle is in progress.

Below the panel 14 in the base 12 there is a horizontal slot 42 from which the copy sheet 44, shown in broken outline, emerges. A basket or tray may be disposed at this location to catch the emerging copies.

Pausing for a moment to consider the geometric arrangement of the copier 10 thus far described, the functions occur in a manner which provides the minimum of movement for the operator notwithstanding that the operator must manually feed the original document 26 to the copier 10. The operator stands in front of the copier 10, facing the panel 14. He lays the original document face down upon the panel 16, moving it to the left to engage its left edge against the guide 28, his right hand being flat on the top of the original document 26. He slides the leading edge of the document 26 into slot 24 as far as it goes. This will be at the nip of a set of rollers to be described below. The operator can press the button 32 with either hand and the copier is energized and goes through its complete cycle.

An important feature of the invention is the manner in which the operation of the copier 10 is synchronized with the movement of the original document 26. This will be better appreciated when the details are set forth hereafter, but mention at this point is deemed advantageous for clarification. While the copier is quiescent, that is with no power applied, the leading edge of the original document is engaged into the nip of the rollers mentioned and detailed below. At this point the copier 10 is energized. The original document immediately moves forward to be illuminated and projected and the sequence of functions of a cycle is also started. This is a simple but highly effective method of synchronizing because it enables many of the functions to be started without the requirement for means to effect a delay and/or means to achieve synchronization by mechanisms or electrical circuitry.

Before the cycle is completed, the leading edge of the document 26 emerges, moving upwardly, from the recess 36 at the rear of the cover member 22, curling up as shown at 26'. The operator may grasp the emerging original document and support it as it emerges completely or permit it to emerge by itself. He may set it aside or once more lay it down upon the panel 16 to make another copy of the same document. In the meantime, the copy 44 is emerging from the slot 42 in the front of the copier 10.

The operator does not have to change his physical position but may maintain his stance in front of the copier 10. It turns itself off when it has made a single copy and the jewel becomes dark. If another copy is to be made the operator is required to press the button 32 once more and feed the original back into the slot 24.

Continuing now with the description of the copier 10 reference is made to FIG. 2 for the basic details of construction and functioning.

The major components which are illustrated in FIG. 2 comprise the following:

the paper supply magazine 38 which is removable and is at the back of the copier 10;

the toner supply and applying device 48;

the drive motor 50;

the illuminating station and projecting means 52;

the corona discharge means 54;

the illumination discharge means 56;

the charging means 58;

the electrophotographic belt assembly 60;

the transfer corona 62;

the original document transport means 64; and the toner fixing device 66.

Various drive members, rollers, guides, clutches, gears and adjustment mechanisms for various purposes are also illustrated and will be explained.

Taking the above principal components seriatim, each can be detailed for explanatory purposes to show how it operates.

Perhaps the most important aspect of the invention resides in the concept of a paper supply magazine which is arranged in a substantial arc. In this apparatus the arc is such that the stack or supply of paper 40 is inserted into the arcuate chamber of the magazine in a vertical movement and pushed downward until it reaches the bottom stop partition 70 at which point the front of the stack is horizontal. Thus, the paper supply 40 is curved through 90° and forms with the shell or chassis of the copier generally a quadrant of a cylinder that is subtended by the inside curved wall 72 of the magazine 38, the rear end of the upper panel 16 as indicated at 16' in FIG. 2, and a vertical plane which is indicated at 74 in broken lines, this plane being defined by the stop partition 70 and extending transversely of the copier.

The magazine 38 has an arcuate back wall 76 which is generally parallel with the front wall 72 and generated on about the same axis of a cylinder of which the front wall 72 comprises a cylindrical quarter surface. The wall 76 conveniently may be fixed as shown in FIG. 2 by reason of a fillet-like brace 78 welded or otherwise secured to the wall 76 and mounting same on the vertical plate 80 that is footed at 82, the foot being welded to the slide plate 84 that carries the magazine 38. A piano hinge 86 extending across the entire magazine 38 will be seen at the upper end of the plate 80 having one of its leaves sandwiched between the fillet 78 and the plate 80. The other leaf of the hinge 86 is secured as by welding to the upper end of an arcuate extension plate 88 that is a curved continuation of the wall 76 but is capable of limited vertical movement indicated by the double-ended arrow 90, being biased to move upward by a leaf spring 92 bowed between the slide plate 84 and the free end of the extension plate 88. Obviously a group of axially aligned hinges could be used instead of a single elongate hinge 86.

The resilience of the spring 92 is such that it will yield when a stack of paper 40 is pushed downwardly in the arcuate paper receiving chamber 94 formed between the walls 72 and 76 but will nevertheless raise the bottom end of the stack, indicated at 40', against the stripping roller 96, the corners of the stack being caught by small triangular stops 98 formed at the opposite ends of the stop partition 70, these stops engaging over the top of the stack. The stripping roller 96 has an elastomeric surface to provide frictional engagement with the upper sheet of the stack 40' to move it to the right as viewed in FIG. 2, overcoming the resistance of the corner stops 98 by the simple expedient of slightly dog-earing the paper but in easy bends so that it springs back to its generally planar condition after having passed these stops in moving to the right as viewed in FIG. 2. The path taken by the paper is shown at 44 in broken lines.

One need not depend upon the stack of paper sheets to push itself between the arcuate extension plate 88 and the stripping roller 96 against the pressure of the spring 92. The plate 88 may be connected to a manual lever (not shown) that extends to the exterior of the magazine 38 enabling the plate 88 to be manually depressed when desired to enable the proper sheets to be moved easily into the position shown in FIG. 2. As will be explained in connection with FIG. 4, automatic means may be provided for the same purpose.

The stripping roller 96 is mounted on a shaft 100 and is driven by a gear 102 in a manner to be described. The roller 96, shaft 100 and gear 102 are mounted on the side walls of the magazine 38 which are not shown in FIG. 2.

The paper leaves the stack at 40' and passes by way of the planar guide member 104 connected to the partition 70 to the nip of a pair of rollers 106 and 108, the lower roller 106 being mounted on a shaft 110 driven by a gear 112 secured to the shaft 110 at one end thereof in a manner to be described. The roller 106 is elastomeric coated so as to drive the roller 108 and the paper 44 as the paper passes between the rollers on its way to the transfer station 114. A guide plate 116 mounted on the post 118 cooperates with another guide plate 120 mounted on the post 122 in feeding the paper member 44 to the transfer station.

An upper guide plate 124 cooperates with the guide member 104.

The guide member 104, shaft 110, roller 106, roller 108 and its shaft 126, post 118 and guide 116 are all mounted on structural parts of the magazine 38. The slide plate 84 preferably slides on suitable guides and/or antifriction means (not shown) on the base plate 128, the latter being part of the main chassis of the copier 10 and either comprising the base 12 or being connected therewith. The upper end of the wall 72 has a flange 130 which cooperates with the end of the upper panel 16' to close the same off but is readily capable of withdrawal therefrom when the entire magazine 38 is pulled out of the back of the copier 10. A simple stop member 132 secured to the base plate 128 limits the inward movement of the magazine 38, that is, to the right as viewed in FIG. 2.

The magazine is shown and explained herein as a drawer-like member capable of being slid into and out of the rear end of the copier 10. It is not expected that its weight alone will be depended upon to hold the magazine in place; hence latches, detents, pins or any other simple mechanical means may be used firmly to hold the same in place for readily being released when desired. In addition, for safety purposes electrical interlocks may be incorporated into the arrangement so that the power circuit is opened when the magazine 38 is removed.

The rear wall 76 of the magazine 38 has a trim or stiffening plate 134 secured thereto as by welding, the bottom of which may be formed into a gripping projection 136 to be grasped by the person desiring to pull the magazine 38 out of the rear of the copier 10.

If the fillet 78 was in the form of a leaf spring the rear wall 76 could be pivoted rearward, to the left as viewed in FIG. 2, to open the chamber 94 wide for inserting a supply paper or for removing paper sheets which may have inadvertently been wrinkled or stuffed into the chamber 94. This alternate construction is described in FIG. 4 but is not normally required. Thus the wall 76 may be permanently secured between end plates or gussets forming the magazine. The paper stack will normally slide down the chamber 94 without wrinkling. The distance between walls 72 and 76 is chosen to accommodate about a hundred sheets of ordinary plain paper without crowding.

Additionally, constructional details of the magazine 38 will be described in connection with FIGS. 3 and 4 but for the time being these will be delayed until the remainder of the details of FIG. 2 has been described.

The toner supply and applying device 48 is shown on the left side of FIG. 2 toward the rear of the copier 10 located wholly within the quadrant defined by the magazine 38 and the plane 74. There is a hopper 138 having an opening at the top which is preferably covered by the closure 140, the hopper also having a cyclindrical formation 142 at the bottom thereof. The cylindrical formation 142 is open from the bottom right hand edge 144 of the hopper 138 to the belt assembly 60 to enable the dispensing of the toner material 146 carried in the hopper. The edge 144 is slightly spaced above the surface of the magnetic roller 148 and it functions as a doctor or metering edge to provide a layer of the toner material 146 evenly upon the surface of the magnetic roller at 145. This is brought into engagement with the belt of the belt assembly 60.

It will be appreciated that the hopper is probably best made out of a non-magnetic material such as brass or plastic and it extends a substantial distance across the width of the copier to enable toner material 146 to be applied to the belt of the assembly 60 fully across the belt.

The magnetic cylinder or roller 148 rotates on the shaft 150 within the cylindrical formation 142 at a speed of several hundred revolutions per minute. This is many times the speed of the belt of the belt assembly such that the drive train would be different. Typical speeds of the other rotating members are twenty to thirty revolutions per minute. In the copier 10 which is illustrated and described, a pulley 152 is secured to the shaft 150 at one end thereof and a belt 151 establishes a coupling to a pulley 153 connected to the shaft of the motor by way of belt 155, sheave 157 and the pulley 159.

The rotary magnetic toning roller 148 of the toning device 48 is often referred to in the art as a magnetic brush and this designation will be used in the claims.

The toner material 146 which is preferred for the copier 10 is a magnetic type of electroscopic dry toner. Since the cylinder 148 is magnetic it picks up the toner from the supply in the hopper 138 and rolls it against the belt where the charged incremental areas of the photoconductive surface of the belt in turn pick up the toner electrostatically, the uncharged area of the belt remaining blank. Any toner which is not picked up by the charged areas of the belt is carried back by the roller 148 to the body 146 in the hopper 138.

It is contemplated according to the invention that the belt assembly 60 will be removable and therefore, some means are provided for moving the entire toner supply and applying device 48 a slight distance away from the belt assembly 60 when it is desired to remove the said belt assembly 60. This is to prevent toner spills and tearing of the belt. In FIG. 2 the shaft 150 is mounted on a yoke or link 154 that in turn is fixed to a shaft or rod 156. The rod 156 extends through parts of the framing structure or chassis of the copier 10 at the ends of the shaft 150 so that access may be had to said shaft 156. The entire device is biased to the right by means of suitable springs such as shown diagrammatically at 158 whereby the magnetic wheel 148 is moved into pressing engagement with the belt or close enough to establish a toning gap that is determined to be suitable for most efficient transfer of the toner material 146 to the belt. Suitable stop means may be provided for this purpose but are not shown in FIG. 2.

By twisting the shaft 156 in a counter-clockwise direction, the device 48 can be tilted to the left against the bias of the spring 158, widening the gap between the magnetic rotor 148 and the belt of the belt assembly 60 and at the same time bringing the opening at the top of the hopper to the left of the position shown. It will be appreciated that if the magazine 38 is not in place, the entire rear end of the copier 110 is open and access may be had to the hopper 138. The upper opening of the hopper is canted so that when pivotally moved a substantial distance to the left by the twisting of the shaft 156, the hopper is erect, the closure member 140 may be removed and additional toner material 146 added to the hopper 138. A lock arrangement may be used to hold the toner supply and feeding device 148 in any position to which it may have been moved. In FIGS. 5 and 6 for example a knob 160 is shown protruding from the side wall 162, the knob being capable of manipulation by the operator to achieve the ends described. Any type of locking mechanism can be used to hold the toner supply and applying device in any rotated position as for example, a simple spring-pressed pin moving with the knob 160 as shown at 164 cooperating with several perforations 166 in the side wall 162. The operator merely pulls the pin out of one perforation and is then able to rotate the knob 160 to bring the pin to any of the other perforations where desired. In normal operating condition, the pin is not in a perforation.

The drive motor 50 is located towards the front end of the copier 10 below the panel 16 and geometrically is outside of the quadrant previously described. It is mounted to one or the other of the side plates, only one being shown at 162. The motor will have gear reduction means so that a counter shaft 168 rotates at a moderate speed in the direction indicated by the arrow thereby driving sprocket wheels 170 and 172. These sprocket wheels are required to be located such that there should be no interference with the removability of the belt assembly 60. A sprocket chain 174 drives the shaft 176 through the sprocket wheel 178 mounted on the shaft 176. This is the belt drive as will be explained. The sprocket wheel 174 drives the sprocket chain 180 that connects with a sprocket wheel 182 mounted on the shaft 184 to which is connected the bottom roller 188 of the toner fixing device 66. The directions of rotation of the various sprocket wheels and rollers are indicated by suitable arrows.

As previously mentioned, the magnetic roller 148 of the toning device 48 is driven at a much greater speed than any of the other mechanisms of the copier; hence it is coupled to the motor 50 without going through the substantial speed reduction gearing that rotates shaft 168. Preferably it is driven by a directly rotating shaft of the motor 50 through a pulley and belt system 151, 152, 153, 155, 157, 159.

The next component which is illustrated in FIG. 2 which it is desired to describe consists of the illuminating station and projecting means 52. It is not strictly proper to refer to the illuminating station and projecting means 52 as a component since the structure comprises several elements and performs several different functions. Accordingly no limitations are to be inferred by the nomenclature used.

The components or structural parts forming the illuminating and projecting means consist of a glass platen 190 that is provided across a substantial portion of the copier on the inside of the cover member 22 set into and held in place by a metal frame 192, the platen 190 being the only window in the top panel 16 giving visible access to the interior of the copier. The bottom surface of the platen 190 faces into a light baffle 194 formed of sheet metal and secured as indicated at 196 to the bottom of the panel 16. The lower walls of the baffle formed a sort of trough by means of the tapered portions 198 and 200, these portions terminating in downwardly extending parallel flanges 202. The flanges 202 terminate immediately above the belt of the belt assembly 60 at a location 204 which can be designated the exposure station because this is where the previously charged electrophotographic member will be selectively discharged in accordance with the patterned radiant energy coming from the illuminating and projection station 52.

A pair of lamps 206 and 208 are mounted within the baffle 194 at the bottom thereof, both lamps extending through the baffle and outside of the side walls thereof to be secured in conventional sockets and connected to the power supply therefor. These lamps are preferably tubular elongate gas filled lamps of the fluorescent type containing mercury and argon but could as well be quartz iodide lamps. Because of the geometric arrangement and the efficiency of the projecting system these lamps operate at lower illumination levels than those in the usual copier. The type of lamps 206 and 208 which are shown have substantially opaque fluorescent coatings either on their interior or exterior leaving window strips at 210 and 212, the lamps being oriented on their axes in such a manner that the windows are directed toward the approximate center of the platen 190 on the bottom and along the length thereof. As will be seen, illumination is adjustable by rotating the socket of the lamp 208 so that its window 212 changes position.

The flanges 202 are secured by screws 220 to a pair of opposing clamping strips 216 and 218 that extend fully across the light baffle 194 and engage between them a rectangular elongate member 214 which may be described as a lens. The lens 214 is adjusted and focussed by moving it up or down in its location between the clamping strips 216 and 218. Any adjusted position may be locked by set screws (not shown) carried by the framework and engaging the lens ends. When the magazine 38 has been removed access may be had to the heads of the screws 220 and other parts of the illuminating station and projecting means. The lens adjustment is normally made in the factory where the copier 10 is fabricated.

The lens 214 is a known element consisting of an elongate, rectangular cross-section molded plastic member having a plurality of optical fibers geometrically placed at locations staggered along the length and passing through from top to bottom edge. Light captured by the upper edge 222 will be faithfully transmitted in collimated fashion by the optical fibers to the bottom edge 224 from whence it will be projected onto the belt at the exposure station 204.

As the original document 26 moves over the platen 190 it is illuminated from the bottom thereof by the lamps 206, 208 and the reflected and illuminated image is transmitted by the lens 214 to the exposure station 204. The location of the lens 222 between the flanges 202 must be adjusted for the sharpest image after which it is clamped in place permanently. It can be understood that only progressive strips of the bottom surface of the document 26 will be projected so that it is essential that the belt of the belt assembly 60 and the original document move in synchronism, and as will be seen since all movement is effected from a single motor 50 there is no problem to achieve such sychronization.

In the process of passing through a cycle of operation, the copier 10 provides for cleaning the belt of any toner which it carries and which was not transferred at the transfer station 114. Cleaning can be preliminary assisted by discharging the belt and neutralizing any remaining toner particles by corona and illumination. The mechanical cleaning or removing of the remaining toner particles is effected directly by the toner applying device 48 as will be explained. Conveniently the corona discharge means 54, the illumination discharge means 56 and the charging means 58 may all be mounted in a single structural assembly because all of them have to be supplied with electric power by wiring. A holder 228 in the form of a bracket or a plate of non-insulating material has compartments 230, 232 and 234 formed by suitable dividers. In the first compartment 230, considering the direction in which the belt moves as indicated by the arrows, there is disposed a corona wire 236 which may consist of a single member or several. This tends to discharge any charge which remains on the belt by applying an even corona opposite in plurality to the charging corona across the belt and neutralizes any toner particles which may be on the belt.

In the next compartment 232 which comprises the illumination discharge means 56 are located a plurality of tungston lamps 238 extending across the belt. These discharge any charged areas that remain on the belt following the corona discharge means 54. In the last compartment 234 there is located the high voltage charging means consisting of a corona wire 240 that applies the charge to the belt evenly across the belt, this charge being of a polarity and sufficiently high intensity which will be acceptable by the photoconductive coating of the belt.

The next portion of the copier to be described comprises the belt assembly 60 which has been mentioned previously in connection with its relationship with other components.

The belt assembly 60 is a self-contained unit preferably and hence is readily removable from the copier 10. It comprises a pair of opposite oval side plates one of which can be seen at 242 in FIGS. 5 and 6. These side plates are spaced apart by suitable rods or braces which are not shown in the drawings. The opposite side plate would be seen at 244 through the belt in FIG. 2.

The principal components of the belt assembly are the two rollers 246 and 248 which are formed of aluminum cylinders extending fully across the belt assembly. The rear roller 246 is the larger of the two and it is located fully within the quadrant previously described, being to the left of the plane 74. Along its top edge, that is along a line parallel with the axis of the roller 246 the belt 250 which is carried by the rollers 248 and 246 passes through the exposure station 204 and to the right of that as viewed in FIG. 2 is the charging station at 252 immediately below the charging means 58 where the belt 250 can receive the charged ions raining down onto the belt from the corona wire 240. The belt passes over the smaller roller 248 in the lower portion of the copier 10 to the right as viewed in FIG. 2, below the motor 50.

The belt 250 in a practical device was formed of three laminated layers, the bottom being polyester sheeting, the middle layer being metal foil and the exterior being a zinc compound. A member of this construction is formed as a strip whose width is somewhat greater than 8½ inches, connected end to end to form the loop of the endless belt. Thus the outer surface 254 presents the zinc oxide to the exterior of the belt for taking part in the electrostatic process while the interior surface 256 of the belt rides on the rollers 246 and 248. The intervening layer which is not identified by a reference numeral comprises the required ohmic layer. The zinc oxide type of photoconductive coating 254 requires a negative corona for charging such that the corona wire 240 is energized for negative charging whereas the corona wire 236 for discharging purposes would furnish positive ions. The voltage of wire 240 is about 6500 while the voltage of wire 236 is about 4000. It is feasible to use other types of photoconductive materials such as for example the crystalline cadium sulfide coating disclosed in U.S. Pat. No. 4,025,339 that requires a negative corona for charging. Positive charging photoconductors could be used.

The chassis or framework of the copier 10 on the far side as viewed in FIG. 2, this being the right hand side of the copier, carries the shaft 176 with the sprocket wheel 178 driven by the sprocket chain 174 and the motor 50. A gear 270 is mounted on the shaft 176, the gear 270 meshing with the large spur gear 154 fixedly mounted on the shaft 274. The shaft 274 may either be a rod fixed to the side plate of the copier on its right side or may be journalled for rotation on said side plate. In the case that it is journalled in the side plate of the copier 10 for rotation, the gear 154 carries a plurality of pins 276 in its face plate, these pins adapted to engage openings 278 provided in a disc 280 that closes off the far end of the roller 246 as viewed in FIG. 2. On the shaft 274 axially spaced away from the gear 154 there is provided a sprocket wheel 282 that is driven by the shaft 274 for a purpose to be described. In the case that the shaft 274 is fixed rod, the sprocket wheel 282 would be journalled on the rod.

The roller 248 is much smaller than the roller or drum 246 so that paper which engages against the belt at the bottom of the belt assembly at the transfer station 114 will not have a tendency to wrap around the belt. This is opposed by the small radius of curvature of the lower end of the belt. The otherwise open ends of roller 248 are closed off by discs 284 or bearings in which shaft 286 is journalled. The roller rotates on shaft 286 which can float to a small extent when the assembly 60 has been removed from the copier 10. The shaft 286 of the roller 248 is mounted between the support plates 242 and 244 in such a manner as to enable the roller 248 to be moved slightly to the left. Such mounting could for example be slots as 243 in side plates 242 and 244. When it is necessary to replace the belt 250 the tension on the belt is relieved by moving the roller 248 slightly to the left as viewed in FIG. 2. Any suitable mechanism can do this, the one shown being only by way of example.

There are links 288 which are connected across the interior of the belt assembly mounted for sliding on the interior of the side plates 242 and 244 along the axis of the oval defined by the belt 250. The sliding is confined by a pin and slot connection 290 of each link. The link 288 shown in FIG. 2 is duplicated on the opposite side. The right hand end of link 288 is engaged to shaft 286 (the slot 243 is not in the link but in the side plate 244). Springs 292 connected to the side plates of the belt assembly 60 tend to pull the link 258 to the right to tension the belt 250 while pushing the shaft 286 and hence the roller 248 to the right as far as permitted in the slots 243. A lever 294 mounted at each end of a shaft 296 protruding through the front side plate and connected to a knob 298 engages a pin 300 on each link 288. Rotating the shaft 296 counter clockwise by means of the knob 242 enables the operator to relieve the tension on the belt 250 so that it can be slipped off the belt assembly frame and replaced. When the knob is released the springs 292 move the roller 248 to the right tensioning the belt 250.

The connection described above as comprising the pins 276 in the gear 276 and openings in the disc 80 serves two purposes. The first is to provide a separable axial coupling between the gear 276 and the roller 264 so that the roller may be driven; the second is accurately to position and locate the left hand end of the belt assembly 60 when it is being installed in the copier. The connection can be anything equivalent as for example an infinite engagement clutch or frictional couplings which do not require radial alignment to achieve positive driving engagement.

The right hand end of the belt assembly must also be positioned accurately but because the roller 248 is idling the requirements are less stringent than the means for mounting and centering the left hand end. Thus the far wall of the framework may carry a stub shaft or pin 291 adapted to engage into a passageway 293 in the support plate 244 when the assembly 60 is installed in the copier 10. During removal, the passageway is readily pulled axially away from and off the pin 291.

The gear 154 also meshes with a magnetic clutch-/gear device 302 which, when energized will drive the shaft 304 to rotate a connecting gear 306 that meshes with the gear 102. When the magazine 38 is fully installed in the copier 10 the gear 102 comes into meshed engagement with the gear 306 so that the large gear 154 is capable of driving the stripping roller 96 depending upon the condition of the magnetic clutch/gear device 302.

A gear 308 meshes with the gear 270 to drive the shaft 310. This gear 308 in turn drives a second gear 314 similar to the gear 308 and also mounted on the same shaft 310 but separated therefrom by a magnetic clutch indicated symbolically at 312. The second gear 314 on the shaft 310 is aligned with the gear 308 but the shaft 310 is two aligned sections so that unless the magnetic clutch 312 is energized the gear 314 will not rotate. The gear 112 is meshed with the gear 314 and will be so meshed when the magazine 38 is in position. Withdrawal of the magazine from the copier 10 pulls the gears 102 and 112 out of meshing engagement with the respective gears 306 and 314.

Drawing attention now to the drive for the original document transport means 64, there are two sets of rollers 316 and 318 mounted on the shafts 320 and 322 respectively with pulleys 324 and 326 also mounted on the respective shafts 320 and 322. The rollers 316 and 318 are rubber covered and extend in sections across the copier 10 within the baffle 200 as best viewed in FIG. 7 where the baffle has been removed. The rollers are arranged in axially spaced groups to provide for positive drive and to facilitate their mounting. The cover member 22 is removable by any suitable means such as detents, screws or the like and carries back-up rollers 328 and 330 which are mounted on shafts 332 and 334. The back-up rollers 328 and 330 are of metal while the drive rollers 324 and 326 are of rubber or other elastomeric material. The rollers 328 and 330 are spring-pressed to engage with the rollers 324 and 326.

The cover member includes a hold down plate 336 tilted up at the right and biased against the upper surface of the glass platen 190. When an original document 26 is driven to the left by the drive rollers 316 and the back-up roller 328 it is directed to lie flat against the upper surface of the glass platen 190 where it can be illuminated.

The sprocket wheel 282 drives a toothed rubber belt 338 that extends over the pulleys or small sprocket wheels 324 and 326 to drive the rollers 316 and 318.

The toner fixing device 66 is an apparatus that fixes the toner to the paper carrier by means of high pressure. The transfer corona device 62 has a transfer corona wire 340 which causes the developed image on the bottom reach of the belt 250 to be transferred to the passing sheet of paper 44 which follows the guide 342 to the nip between the drive roller 188 and the pressure roller 344. The construction of the device 66 is well known, the device being commercially available; hence there is no need to describe in detail its construction and operation. It will be appreciated that any form of toner fixing means may be used. For example, the toner may be fixed by heat in which case there would be a source of heat or infra red radiation at the location of the toner fixing device 66 toward the front of the copier 10.

Figure 4:
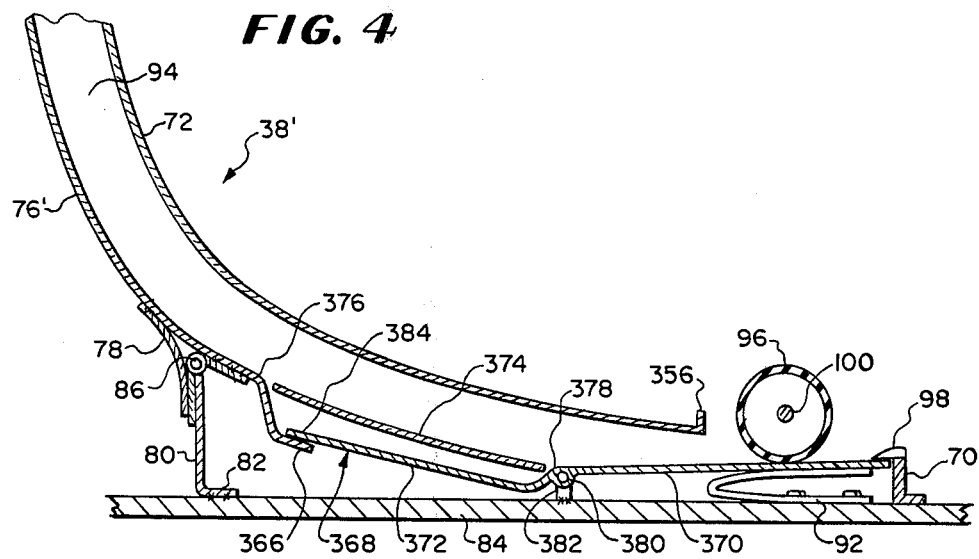
FIG. 4 is a fragmentary somewhat kinematic view of a mechanism for enabling the rear wall of a paper supply magazine similar to that of FIG. 3 to be pivoted away from the magazine in order to open the paper receiving chamber.

Attention is now invited to FIG. 3 and to FIG. 4. In FIG. 3 there is illustrated in perspective view a practical magazine 38 some of the parts thereof having previously been identified in the description above. The framework or chassis for the magazine 38 is built upon the slide plate 84, there being a pair of opposite L-shaped structural members 348 and 350 secured to the top of the slide plate 84 along its side edges by means of suitable flanges such as shown at 352. The lateral tab 354 has an equivalent on the opposite side and it helps to center the magazine when it is inserted into the rear of the copier 10. Alternatively there may be guides, anti-friction rollers, etc. in the copier to receive and center the magazine 38 in its movement into and out of the copier.

The front or inside arcuate wall 72 is permanently secured between the side plates 348 and 350 with its vertical end 72' somewhat extended and not following precisely the quadrant curves. The forward edge at 356 is flanged for stiffness.

It can be seen that the stripping roller 96 is mounted on the shaft 100 and is journaled by means of suitable bearings at 358 and 360. Its gear 1012 protrudes laterally from the side plate 350. This gear 350, it will be recalled from the above description, is adapted to engage with the gear 306 that, in turn, is connected to the shaft 304 which carries a magnetic clutch and gear 302 for engaging with the gear 154. In this manner, when the magnetic clutch is energized by the program of the copier (which is built into the electronics that operate the system and which are not shown) the stripping roller 96 will be driven to strip the upper sheet of paper from the stack at 40' and move it into the nip of the rollers 106 and 108. The paper sheet is shown in broken lines at 44 and it waits at this point until the timing of the system operates the drive roller 106.

The drive roller 106 is a rubber covered roller as seen in FIG. 3 mounted on the shaft 110 and journalled in suitable bearings 362 in the side plates 348 and 350. The gear 112 is fixed to the end of the shaft where it can mesh with the gear 314 that in turn can be rotated by the shaft 310 when the magnetic clutch 312 is energized. This couples the gear 308, driven by the gear 270, to the gear 112. The back up roller 108 is mounted on the shaft 126 journalled in the bearings 364 in the side plates 348 and 350.

It may be assumed that the rear wall 76 of the magazine 38 is fixed so that the chamber 94 cannot be opened, but as previously stated this wall can, in another embodiment, be hingedly mounted to enable it to swing back. One version has been explained in substituting a leaf spring for the fillet 78. Another version is shown diagrammatically in the magazine 38' in FIG. 4.

In FIG. 4 the slide plate 84, stop plate 70, corners 98, front arcuate wall 72, vertical plate 80 and foot 82, stripping roller 96 and leaf spring 92 are substantially the same as these elements in the copier 10 of FIG. 2. The fillet 78 may or may not be included in the structure as a leaf spring. The hinge 86 is substantially the same in both figures. The rear wall is designated 76' and for the most part its contours follow the contours of the wall 76 of FIG. 2 but its bottom end dips below the line of curvature defined by a continuation of the wall 76' to form a shallow ledge 366. A rocking plate 368 has a front part 370 and a rear part 372. The front part 370 is upwardly offset relative to the rear part to provide a continuation of the contours of the rear wall 76' of the magazine, there being a fixed bridging plate 374 that extends from the bend 376 adjacent the lower end of the rear wall 76' to the center 378 of the rocking plate 368 where the offset front part 370 begins.

The center 378 of the rocking plate 368 is pivotally mounted at 380 to an upstanding plate 382 welded or otherwise secured across the upper surface of the slide plate 84. The leaf springs 92 bias the front part 370 to move upward in a counterclockwise direction about the pivot 380 tending to cause the front part 370 to press any paper sheets lying thereon against the stripping roller 96 with the opposite paper corners caught beneath the triangular stops 98. These stops and the roller 96 limit upward movement of the front edge of the part 370 when no paper is present.

The rearmost edge 384 of the rear part 372 of the rocking plate 368 is shown in FIG. 4 lying on the ledge 366 of the rear wall 76', below the bend 376 with no paper in the magazine 38'. When there is a supply of paper in the magazine 38', the front part 370 of the rocking plate 368 occupies a position lower than shown because the springs 92 are compressed. The paper sheets are in condition to be consecutively stripped off the stack and fed toward the transfer station 114. When there is a supply of paper present the rearmost edge 384 will be slightly spaced above the ledge 366 but will gradually move downward as the paper sheets of the supply are depleted.

Assuming now that the supply of paper sheets is depleted, the rear wall 76' may be swung "open" in a counter clockwise direction about the hinge 86 against any suitable spring bias which may be provided as for example, the bias of the fillet 78 which is shown as a leaf spring in FIG. 4. That is to say that the upper edge is secured to the wall 76' and the lower edge is free to slide against the standard 80 and/or a fixed wing of hinge 86.

As the wall 76' is swung "open" it will provide access to the chamber 94 along a substantial portion of its arc enabling any paper jams to be removed but additionally enabling a stack of paper easily to be inserted. For example sheets substantially shorter than the normal eight and a half inches in length can be inserted.

Where the paper comprises a large stack or is relatively stiff there would normally be no difficulty in forcing the bottom, leading edge of the stack between the stripping roller 96 and the front part 370 of the rocking plate 370 against the pressure of the springs 92. Nonetheless, in order to simplify paper insertion the structure described operates to lower the part 370 automatically when the wall 76' is swung outward. This is effected by the rearmost end 384 of the part 372 of the rocking plate 368 being raised by the ledge 366. This movement rotates the rocking member 368 in a clockwise direction about the pivot 380, causing the part 370 to move downward away from the stripping roller 96 against the springs 92, the latter being compressed as a result.

In this condition and holding the wall 78' in its outward condition, the operator can load the magazine. The paper will readily ride over the bridging plate 374, onto the part 370 and into dispensable position engaged against the stop 70.

In FIG. 5 the panel 18 has been swung down about the hinges 390 that are connected between the panel 18 and the base plate 128 or the sheet metal base 12 of the copier 10. There is a conventional magnetic latch arrangement consisting of the small magnets 392 secured to the side plate 162 of the copier chassis and the small steel plate 394 adhered to the inside of the panel 18. Opening the side panel 18 requires only pulling the same outward against the attraction of the magnets 392 for the small plate 394.

With one side plate 18 on the left side of the copier 10 pulled down to the position shown the side plate 242 of the belt assembly 60 is exposed, being visible through an oval perforation 396 that is cut into the plate 242. As mentioned previously, all coupling means for driving the belt 250 are mounted on the right hand side of the copier to the chassis or side plate. This is not shown directly but can be understood from the explanation given above.

A centering and supporting bracket 398 formed of a robust gauge of metal is hingedly secured to the chassis either directly to the base plate 128 or sheet metal of the base 12 overlying the base plate 128. The bracket has a socket or perforation 402 which is accurately located to engage the protruding pilot end 404 of the shaft 274. In the case that the shaft 274 rotates, the perforation 272 may have an antifriction sleeve therein. The bracket has an ear 406 at its upper end which can be grasped to enable the bracket to be pulled down to the broken line position shown in FIG. 5. When this has been done the belt assembly 60 can be grasped by the handle and pulled out of the chassis as shown in FIG. 6. This cannot readily be done, however, unless the toning device 48 has been swung out of engagement with the belt 250 as previously explained.

In removing the belt assembly 60 the pins 276 are separated from the perforations 278 of the end disc 280 of the roller 246 and the discs slip off the shaft 274 while passageway 293 moves away from the pin 291. With the assembly 60 separated from the copier 10 the knob 298 can be manipulated to retract the roller 248 sufficiently to enable the sleeve comprising the belt 250 to be removed and replaced. Replacement of the assembly 60 is done by the reverse procedure.

Figure 7:
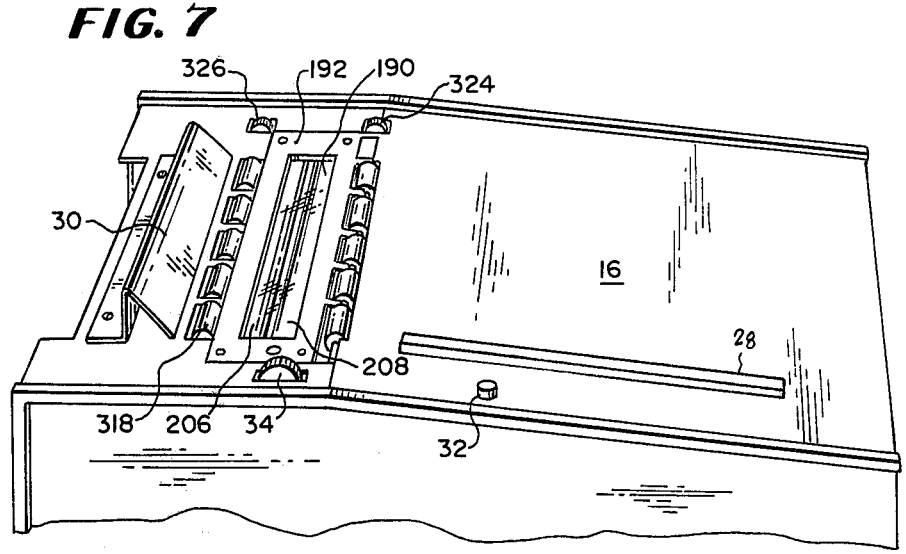
FIG. 7 is a fragmentary top view of the copier with the light-blocking cover member and the paper supply magazine removed to show the platen and various components normally hidden from view.

In FIG. 7 there is illustrated the appearance of the copier from the top with the cover member 22 removed. The framing plate 192 can be seen with the glass platen 190 in its center. Front and rear of the plate one can see the series of rollers 316 and 318 which, as illustrated, are in sections spaced along the lengths of the respective shafts 320 and 322. Portions of the upper panel 16 extend between the roller lengths like fingers separating the roller sections. At the far end of the panel one can see the upper segments of the pulleys or sprocket wheels 324 and 326 protruding slightly from slots in the panel 16.

The lamps 206 and 208 are much closer to one another and to the platen 190 than appears from the diagrammatic view of FIG. 2. In FIG. 7 these lamps can be seen through the transparent glass platen 190 and their distance apart is more readily perceived as relatively close together, say by a fraction of an inch.

The thumb wheel 34 which is connected to the socket for the lamp 208 protrudes from a slot in the panel 16 to enable slight rotation of the lamp 208 for adjusting the amount of illumination. The wheel and/or the panel may be suitable marked to indicate the degree of illumination resulting from different dispositions of the wheel 34.

Figure 8:
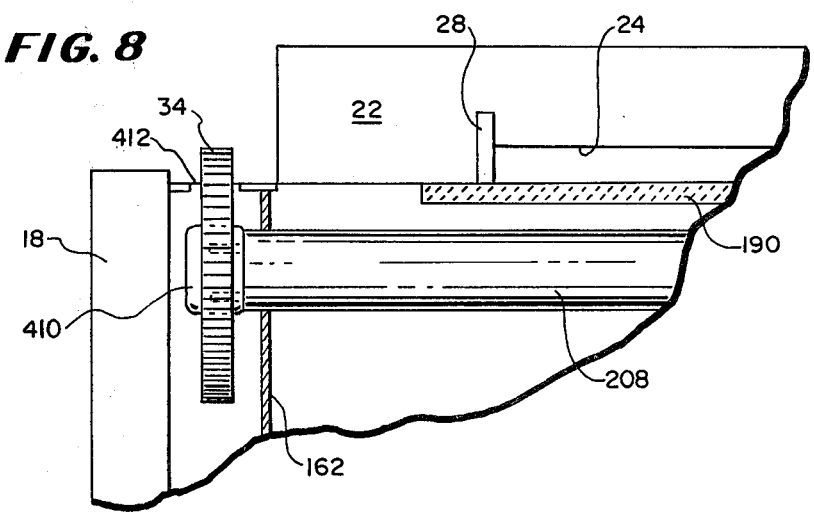
FIG. 8 is a fragmentary diagrammatic view looking at the front of the copier, somewhat in section, to show the illumination adjusting mechanism.

In the diagrammatic view of FIG. 8 the relationships between the lamp 208, platen 190, the cover member 22 and the portions of the copier in the view can be seen. The lamp 208, just like the lamp 206 (not shown in FIG. 8) extends substantially beyond both ends of the platen 190, with the terminal ends mounted in sockets, one of which is shown at 410 protruding beyond the inner side plate 162 of the chassis. The thumb wheel 34 is mounted to the socket 410 and protrudes through the slot 412 in the panel 16 alongside of the cover member 22. Rotating the wheel 34 will change the aspect of the window 212 of the lamp 208, as explained, thereby varying the total illumination of the strip of the original document which is at the time engaged against the platen 190.

The simplicity of the apparatus of the copier 10 enables the programming and timing to be effected with a minimum of circuitry, that circuitry which is used being readily evolved by an engineer skilled in the electronics arts after an understanding of the operation is achieved. Accordingly, no circuitry is illustrated but instead, the timing diagram and explanation should suffice.

Looking now at the timing diagram, FIG. 9, it can be seen that the horizontal bars 420, 422, 424, 426, 428 and 430 represent the times that the important functions of the copier 10 are occurring. All of them are related as well to the total distance that the belt 250 has travelled. The circumferential length of the belt in a practical example was chosen to be 16 inches (about 40.64 centimeters) and a cycle was accomplished with two revolutions of the belt or 32 inches of travel. In that example the time for a cycle was slightly more than 12 seconds and in FIG. 9 the same horizontal scale used to show the belt travel is also used to show the elapsed time.

The relationship of the belt position and the timing of the cycle is required to take into consideration the position of the belt with respect to the seam, if there is a seam. It is essential in such case that the belt stop at substantially the same attitude for each cycle so that the seam does not interfere with the latent image.

Assuming a belt with a seam, which at the present time is the construction contemplated for the practical example, there is a timing hole in the far belt edge indicated at 432 in FIG. 2. The belt 250 is formed with a foil or metallic strip at the far edge that is in electrical contact with the ohmic substrate of the belt 250 as well understood by those skilled in this art, the photoconductive material 254 being an outer layer of the belt. The metallic edge is engaged by a metal brush (not shown) mounted on the framework of the copier and grounded thereto so that the corona gaps for the charging and discharging corona are between the wires of the corona devices and the grounded, conductive substrate of the belt 250. Conveniently, the hole 432 is in the conductive strip so that the means for sensing the hole 42 may be mounted on the far side plate of the chassis of the copier 10 as viewed in FIG. 2. Such means are represented symbolically by a source of light 434 and a photodetector 426 responsive to the light (see FIG. 2).

Recall that the belt assembly 60 is removable from the copier so that the source 434 and photodetector 436 are required to be on the side of the chassis where lateral movement of the belt assembly 60 will not be interfered with.

Returning now to the timing diagram of FIG. 9 it will be noted that the bar 420 represents the movement of the belt 250 for operation of the discharge corona 54, energization of the motor 50, movement of the belt 250, energization of the lamps 206 and 208, operation of the rollers 316 and 318 operation of the toning device 48 and operation of the toner fixing or fuser device 66. Furthermore, this bar extends the full length of the diagram. The significance of this is that when the power is turned on by the operator through pressing the button 32 the motor 50 starts and continues for the complete cycle and the electrical circuitry turns on the lamps 206 and 208 as well as the discharge corona 54, all of which are energized for the complete cycle. The motor 50 has mechanical coupling with all of the driven rollers of the copier 10 but that coupling is direct only with the belt roller 246, the fuser drive sprocket wheel 188, the toner magnetic roller 148, the rollers 316 and 318 and the roller 148 of the toning device 48 through gearing. Accordingly the direct coupled rollers are rotating for the full cycle even though they may not be performing their functions for the full cycle.

The arrangement described makes for simplicity and reliability in the operation of the copier.

The electrical circuitry is such that the sensing of the hole 432 by the photoresponsive combination 434/436 will deenergize the power applied to the copier and will place the circuitry in such a state that the manual operation of a switch through the button 32 will restore the power. The circuitry is also arranged so that the photoresponsive combination will be ineffective the first time that it "sees" the hole 432 after the power has been restored but effective the second time thereby enabling the belt 250 to make two complete revolutions for each cycle.

When the power is applied to the electrical circuitry a clock is started which controls, through suitable switching means and logic, the timing of the functions which are not effected directly by the rotation of the motor 50 and electrical apparatus energized simultaneously with the motor for the full cycle. The first functions represented by the bars 422 and 424 become effective after the belt 250 has travelled a fraction of an inch. The charge corona 58 is turned on and the stripper magnetic clutch 302 is energized which starts the rotation of the stripper roller 96. The lamps 206 and 208 have been energized and the rollers 316 and 328 have gripped the original document 26 and moved the same forward to the platen 190 where it is illuminated, the progressive strips of the pattern carried by the document 26 being projected through the lens 214 to the exposure station 204. The charge corona 58 has been charging the photoconductive surface 254 of the belt 250 so that a latent image is being progressively formed at the exposure station 204 and carried counterclockwise around to the developer station represented by the engagement of the magnetic roller 148 with the belt 250. The latent image in this manner is progressively applied to the surface of the belt 250.

The movement of the stripper roller 96 carries the top sheet of paper from the stack at 40' along the path 44 to the nip between the so-called synchronizing roller 106 and its back-up roller 108 where it stops, being in a slight bow so as to provide a positive and immediate movement when the time comes for it to move forward (to the right as viewed in FIG. 2). The movement of the paper sheet to its poised position at the synchronizing roller 106 terminates when the belt has moved five inches according to the chart of FIG. 9. The clutch 302 is deenergized at this time. A fraction of a second later, the belt having moved an additional two inches, the magnetic clutch 312 is energized and the synchronizing roller 106 captures and drives the sheet of paper along the path 44 to the transfer station 114 where it meets the moving developed image on the bottom reach of the belt. The transfer corona 62 has been energized in meantime at the point of about nine inches of movement of the belt 250. Assuming that the photoconductor 254 of the belt is the type which is charged negatively by the corona 58, the transfer corona is negative in polarity behind the paper sheet to attract the positive toner to the paper surface from the belt. The voltage is typically about 6000 volts d.c. and a good portion, typically 50% to 75% of the toner from the belt 250 is transferred to the sheet of paper which moves along the guide 342 to the nip of the rollers 188 and 344 where it is fused to the paper and ejected from the copier through the slot 42.

The charge corona 58 is negative at about 6500 volts d.c. and it remains energized for a complete revolution of the belt, that is, a full sixteen inches of travel. Thus, if paper in the stack 40 is either 11½ inches long or 13 to 14 inches long there is sufficient travel of the belt to accommodate the same as a reproduction of an original document of either size within a complete revolution of the belt 250. Obviously shorter paper is readily handled as well.

The charge corona 58 is deenergized after the single revolution of the belt, the alternate revolution being for the purpose of cleaning the belt.

The small diameter of the roller 248 as illustrated makes it difficult for the paper to adhere to the belt and make the turn so that the paper is stripped off the roller and passes to the fuser 66. Typically and for the practical copier which is described in this specification, the diameter of the larger driven roller 246 is two inches and the diameter of the smaller idler roller 248 is one inch. The assembly 60 may have any known means to keep the belt 250 accurately tracking without lateral wandering.

Inasmuch as the fuser 66 is being driven at all times during the cycle it is immaterial when the toned sheet to which the developed image has been transferred arrives. It will be fixed and pass out of the slot 42 of the copier.

After a single revolution of the copier belt 250 the leading edge of the surface 254 which constituted the developed image is just before the discharge corona 236. At this point the discharge lamps 238 of the discharge section 56 are energized. Any toner which remained on the belt and which was not transferred is neutralized by the discharge corona 54, this being maintained at a voltage of about 4000 volts positive d.c., its adherence to the belt being minimumized by the discharge corona. The actual removal is effected by the rotating magnetic roller 148. The discharge corona is energized at all times during the cycle.

The discharge illuminating device 56 is for discharging any charge which may have remained on the belt 250 by means of light, the means used to produce the latent image being, of course, also light. The discharge lamps come on after the first revolution of the belt and remain energized for the complete second revolution of the belt. This selective lighting of the lamps ensures that the light from the device 56 will not interfere with the charging of the photoconductive surface 254 by the corona device 58 in the very next compartment. Leakage of light is countereffective to the function of charging the photoconductor 254 fully and evenly.

The photoresponsive combination 434/436 is rendered inoperative when the hole 432 passes at the end of the first revolution, but is enabled by the circuitry so that it is ready to respond when the second revolution is completed.

The cleaning of the belt surface is completed by the magnetic toning device 48 which effectively brushes off all toner remaining after transfer. The toner is neutralized and the belt totally discharged by the corona device 54 and the light discharge device 56 during the second revolution of the belt. Note that the magnetic toning roller 148 is rotating rapidly at all times that the copier 10 is energized.

The transfer of the developed image does not commence until the leading edge of the developed image has passed along the lower reach of the belt 250 and reached the transfer station 114 at the bottom of the belt assembly 60 opposite the bottom of the idler roller 248. Thus the transfer is taking place even after a complete revolution of the belt has been effected and well into the second revolution. This is reflected in the chart of FIG. 9 by the length and position of the bar 430, starting at 9 inches of movement of the belt and continuing until 25 inches, this being a total of 16 inches of movement. The transfer corona 62 is deenergized after 25 inches of travel of the belt because it is no longer needed.

When the hole 432 reaches the photoresponsive combination 434/436 the power of the copier is automatically turned off. Note that the lamps 206 and 208 were illuminated for the complete time such that their illumination indicates that the power is on and their extinguishment indicates that the power is off. The light from these lamps is seen in the jewel 39 by the operator who thus knows exactly when the power has been turned off.

The belt 250 may be braked by any suitable means if desired but it has been found that the pressure exerted by the rollers 188 and 344 upon one another produce substantial friction such that there will be very little coasting when the power is removed and the motor 50 stops.

In order to convey some concept of the compactness of the copier 10 of the invention some of the dimensions of the practical device are set forth hereinafter and the remainder of the apparatus may be visualized proportionally from these dimensions.

The dimensions of the rollers constituting the belt assembly 60 have already been given above. Additionally the distance between the axes of the rollers is dictated by the length of the belt 250 and geometrically can be computed. It is about 5⅝ inches.

The magnetic roller 148 is 9 inches in length transversely of the copier to provide coverage across the image on the belt which has been produced by paper 8½ inches wide. The belt is about 9½ inches wide exclusive of its contact strip.

The overall width of the practical copier including the side panels which swing down is 15 inches and the length of the device front to back is about 14 inches. It stands about 8 inches above any surface upon which it rests. The slot 24 is about ⅜ inch high.

Some of the features of the invention are capable of being used with advantage in other copiers but those which have been combined to achieve compactness herein act in a unique combination to result in a very small but efficient copier. For example, the particular manner of imaging together with the concept of effecting transfer at the bottom of the belt assembly 60 for a period of time while the belt has made more than a revolution result in the compression of the dimensions to achieve the compactness which is so important.

In the claims some language and expressions are used which are intended to designate different aspects of the invention in language which will cover many of the variations in structure and uses to which the copier may be put without unnecessarily limiting the said claims. The original document 26 could be any kind of graphic or text material and is referred to as a patterned original. Obviously this could be a previously made copy. The location where the toning magnetic roller 148 engages the belt is referred to as a toning station. It is also considered that the latent image is developed at this point. The location 204 is called the exposure station because at this point the charged belt surface is exposed to the continuously moving strip of light which has been projected from the original document. The sheets of plain paper which comprise the stack 40 are referred to as carrier medium sheets because they could be any form of paper or perhaps plastic sheets or printed matter, as for example, forms which are to be completed or sheets of copy material which have been reversed so that printing is achieved on both surfaces thereof. The magazine 38 is said to have an entrance at the top thereof and a discharge port, the latter being intended to comprise any structure which holds the paper in position until the top sheet is removed. Thus, in the structure of FIG. 2, the discharge port for the magazine comprises the stop wall 70 and the upper opening formed between the stop wall and the flange 356 from which the sheets will be withdrawn during the operation of the copier.

The fuser device 66 fixes the toner which is transferred from the belt 250 and is referred to as fixing means.

The belt 250 is said to be in oval configuration, this designation being intended to describe the general type of oval used in the specification and drawings with flat sides, called upper and lower reaches, and the unequal radius arcuate ends. For the maximum of benefit of the invention it is best for the configuration of the belt to be oval as described, especially because one end of the oval can be located within the subtended quadrant of the arcuate magazine 38. The advantages of the arcuate magazine 38 can to some extent be achieved in copiers which have the electrophotographic member moving other than in a horizontally or somewhat tilted horizontal configuration. For example, a cylindrical configuration is provided by the use of a drum will still provide a compact copier although its vertical height might have to be increased over that of the preferred form.

The location along the belt where the photoconductor 254 is charged is designated 252 in FIG. 2 and this is called a charging station in the claims. The imaging system is generally used to describe several aspects which include the charging station and the exposure station 204. The illuminating station and projecting means 52 are together composed of several components which function in concert to achieve the projection of the pattern of the original document 26 onto the belt. The claims to some extent differentiate between the functions but generally reference to means for projecting the pattern is considered that which is necessary to illuminate the document and project the collimated pattern to the exposure station.

Other expressions which are used in the claims should be apparent from the disclosure herein. Relative locations are intended by words such as front, rear, side, top, bottom, etc. The expressions downstream and upstream are used as a simple way to locate components with respect to the direction of movement of the belt. The spacing of the discharge port of the magazine 38 from the rear wall 134 is defined by its distance from a plane tangent to the arc at the top of the magazine because the rear wall 134 is not essential to the structure. The parallel plane 74 is a convenient way of defining the quadrant formed by the magazine curvature.

Variations are capable of being made in the details of the apparatus without departing from the spirit or scope of the invention; hence it is desired to be limited only by the coverage of the appended claims, considered within the maximum range of equivalents to which the inventor is entitled in the light of the prior art.

What it is desired to secure by Letters Patent of the United States is:

1. A table top electrostatic copying machine comprising:

A. a housing for the machine having a top wall, a base, a front end wall, a rear end wall opposite the front end wall and opposite side walls, B. an imaging system within the housing and comprising a flexible electrophotographic belt, rollers supporting the belt in a primarily horizontally extending elongate tensioned oval loop providing an upper and a lower reach, driving means for rotating at least one of the rollers for moving the belt in its loop, an exposure station adjacent the upper reach where a narrow strip-like pattern of light is adapted to be applied across the belt progressively to form a latent image across the belt and along the belt as it moves past the exposure station in a predetermined direction, a charging station including means for charging the belt surface across its width located adjacent the exposure station and upstream thereof whereby to charge the belt surface progressively just before the belt passes through the exposure station, C. means for moving a patterned original member progressively along said top wall and means for projecting the illuminated pattern of said original member from said top wall into the interior of the housing and to said exposure station in synchronism with the movement of the belt whereby the illuminated pattern provide said narrow strip-like pattern of light selectively to discharge the charged surface progressively to form said latent image, D. a toning station downstream of the exposure station and adjacent one of the said rollers having means for toning the latent image to develop the same on the belt surface progressively as the belt carries the latent image around said one roller and onto the lower reach of the belt, E. an image transfer station adjacent the lower reach of the belt for transferring the developed image carried to the lower reach onto a sheet of carrier medium, F. said rear end wall comprising an arcuate magazine arranged to hold a supply of carrier medium sheets, said magazine including an interior arcuate chamber for the supply of sheets and having a top entrance located generally at the juncture of the magazine with the top wall and presenting a vertical passageway into said chamber for receiving said supply, said magazine having a discharge port close to said base and spaced inwardly toward the front end wall away from a vertical plane which is substantially tangent to the magazine adjacent the top entrance, the discharge port providing a horizontal passageway for egress of sheets of carrier medium from said magazine, the chamber being smoothly curved from vertical to horizontal and arranged to hold said supply in a curved disposition, G. means for stripping a single sheet from the supply of carrier medium sheets in the magazine at the discharge port and feeding the same to the image transfer station in synchronism with the movement of the belt and in timed relation to the developed image arriving from the toning station and H. means for moving the sheet after it has passed through the transfer station out of the housing past the front end wall.

2. The copying machine as claimed in claim 1 in which at least the toning station, said one roller, at least a major portion of the stripping means, said exposure station and a substantial portion of the means for moving the patterned original and projecting means are located within the housing within the approximate segment of a geometric three dimensional figure defined by the chamber of the magazine, said top wall, side walls and a vertical plane normal to the base at the discharge port of the magazine.

3. The copying machine as claimed in claim 1 in which the magazine is retractable from the housing to open the housing at its rear.

4. The copying machine as claimed in claim 1 in which toner fixing means are provided between the transfer station and the front end wall.

5. The copying machine as claimed in claim 2 in which the stripping and feeding means include sheet stripping roller means and sheet synchronizing roller means carried by said magazine.

6. The copying machine as claimed in claim 3 in which the stripping and feeding means include sheet stripping roller means and sheet synchronizing roller means carried by said magazine, said roller means being connected with said driving means to be driven thereby when the magazine is disposed installed in housing, the connections being separable when the magazine is retracted.

7. The copying machine as claimed in claim 5 in which selectively operable coupling means are provided between the roller means and driving means to enable timed operation of the stripping roller means and the synchronizing roller means independently of one another.

8. The copying machine as claimed in claim 6 in which, the said separable connections are mechanical, in addition to said mechanical separable connections selectively electrically operable coupling means are provided between the roller means and driving means to enable timed operation of the stripping roller means and the synchronizing roller means independently of one another when the magazine is installed in said housing.

9. The copying machine as claimed in claim 1 in which said stripping and feeding means include:
a stripping roller disposed at the discharge port adapted to be in engagement with said single sheet, first disconnectible means for selectively coupling said stripping roller to said driving means to provide for the removal of said sheet from said supply and the movement of said single sheet to an intermediate position part way to said image transfer station; a pair of engaged synchronizing rollers disposed at said intermediate position and adapted to receive said single sheet and move the same the remainder of the way to said image transfer station and past the station to the said means for moving the sheet out of the housing, second disconnectible means for selectively coupling said synchronizing rollers to said driving means to provide for the timed movement of said single sheet to the transfer station in synchronism with the arrival of the developed image on the belt at said transfer station.

10. The copying machine as claimed in claim 9 in which the disconnectible means comprise magnetic clutches and the copying machine includes means for programming the operation of said clutches.

11. The copying machine as claimed in claim 5 in which at least said sheet stripping roller means are located within said geometric figure.

12. The copying machine as claimed in claim 2 in which the magazine is retractable from the housing to open the housing at its rear.

13. The copying machine as claimed in claim 12 in which the stripping and feeding means include sheet stripping roller means and sheet synchronizing means and in which at least said sheet stripping roller means are located within said geometric figure.

14. The copying machine as claimed in claim 1 in which said last mentioned means include toner fixing means disposed within said housing adjacent the said front end wall.

15. The copying machine as claimed in claim 14 in which said toner fixing means include roller means driven by said driving means.

16. The copying machine as claimed in claim 2 in which said means for moving said sheet out of said housing include toner fixing means disposed within said housing adjacent the said front end wall.

17. The copying machine as claimed in claim 3 in which said means for moving said sheet out of the housing include toner fixing means disposed within said housing adjacent the said front end wall.

18. An electrostatic copying machine comprising:
A. a housing for the machine having a top wall, a base, a front wall, a rear end wall opposite the front end wall and opposite side walls, said side walls including inner support plates and outer panels parallel with and adjacent to said respective support plates,
B. an imaging system within the housing and comprising a flexible electrophotographic belt, rollers supporting said belt in a primarily horizontally extending elongate tensioned oval loop having upper and lower reaches, an electric motor supported on one of said inner support plates and coupling means between the motor and one roller for rotating said roller to move the belt in its loop in a predetermined forward direction, an exposure station adjacent the upper reach for exposing the belt to an illuminated pattern to be reproduced, a charging station for charging the belt before it moves into the exposure station,
C. means coupled to said motor for moving a patterned original member progressively along the top wall and means for projecting a light image of the pattern to the exposure station in synchronism with the belt movement to form a latent image of the pattern on the belt,
D. a toning station downstream of the exposure station at one end of the loop for developing the latent image as the belt moves past said toning station,
E. an image transfer station on the bottom reach adjacent the second loop,
F. means for storing a supply of carrier medium sheets associated with said housing and means coupled to said motor for removing a sheet from the supply and feeding the sheet to the image transfer station at the bottom reach of the belt loop adjacent the second roller thereof, said means for removing and feeding being arranged to bring the sheet adjacent the belt reach in synchronism with the arrival of the developed image, said means of storing the supply of carrier medium sheets being located at the rear end wall and including means for shaping the configuration of of the supply such that one end of said supply is adjacent the top wall and the other end is adjacent the base and below the belt, and G. means for moving the sheet out of the housing past the front wall after the developed image has been transferred thereto.

19. The copying machine as claimed in claim 18 in which the toning station comprises a rotary magnetic brush engaged against said belt and capable of being moved away from the belt to enable removal of the belt.

20. The copying machine as claimed in claim 18 in which the belt and rollers are mounted in a framework comprising a belt assembly, said coupling means between said one roller and motor are separable, the belt assembly is mounted beween the inner support plates, the second inner support plate has a passageway for said belt assembly and the outer side panel adjacent said second inner support plate is swingable away from said second inner support plate to enable removal of said belt assembly from said copier through said passageway.

21. The copying machine as claimed in claim 20 in which the said separable coupling means include a rotary drive member driven by said motor and mounted for rotation on said one inner support plate coaxially with said one roller, said drive member and one roller having cooperative connecting means which engage and accurately locate said one roller when the said belt assembly is operatively mounted between said inner support plates but will readily disengage when said belt assembly is removed.

22. The copying machine as claimed in claim 21 in which second cooperative connecting means are provided on said belt assembly framework and said one inner support plate spaced from said first-mentioned cooperative connecting means, said second cooperative connecting means being adapted to engage and accurately locate said second roller when said belt assembly is operatively mounted between said inner support plates but will readily disengage when the belt assembly is removed.

23. The copying machine as claimed in claim 22 in which means are provided for moving the axes of the rollers toward one another to relieve the tension in said belt to enable the belt to be removed from said rollers in an axial direction.

24. The copying machine as claimed in claim 18 in which there is a framework supporting said rollers and belt, including oval side plates configured generally the same as the oval defined by the belt, the framework, rollers, belt and oval side plates comprising a belt assembly, there is a passageway in the second inner support plate, the coupling means between the motor and one roller of the belt assembly including a driven rotary member mounted on said one inner support plate, an axially separable connection between said one roller and the driven rotary member and means for positioning the assembly in operative condition and including means laterally confining and supporting the said one roller while said belt assembly is so confined and supported, the one outer panel adjacent to said second inner support plate being separable from said second inner support plate to give access to said second inner support plate to enable removal of said belt assembly from said copier through said passageway.

25. The copying machine as claimed in claim 18 in which means are provided for moving the axes of the rollers toward one another to relieve the tension in said belt to enable the belt to be removed from said rollers in an axial direction.

26. The copying machine as claimed in claim 18 in which the means for projecting the illuminated pattern include a transparent platen in said top wall, said means for moving the original member along said top wall will carry said original member over said platen, illuminating lamps are disposed below said platen laterally of the center thereof, a rectangular cross section lens is disposed aligned with the center of said platen and leading to said exposure station and means are provided to limit the illumination from said lamps which reaches said exposure station to only that light which is reflected from said platen bottom and passes through said lens.

27. The copying machine as claimed in claim 18 in which toner fixing means are provided in the path of said sheet between said transfer station and said front wall.

28. The copying machine as claimed in claim 27 in which said toner fixing means comprise a pressure fuser including at least a pair of engaged rollers through which said sheet moves, the rollers being coupled for rotation to said electric motor.

29. The copying machine as claimed in claim 24 in which the means for laterally confining and supporting said one roller comprise an elongate shaft mounted on said one inner support plate and having said driven rotary member and one roller mounted thereon, said shaft extending fully through said roller and an end thereof protruding from the oval side plate of the belt assembly at said passageway and being exposed when said outer panel is so separated, there being centering means pivotally mounted to said housing for engaging, centering and supporting the said protruding end when the belt assembly is in operative position but being removable from said protruding end to permit removal of said belt assembly.

30. The copying machine as claimed in claim 29 in which the centering means are mounted independently of said one outer panel and accessible only when said outer panel is separated from said second inner support plate.

31. The copying machine as claimed in claim 18 in which said means for storing a supply of carrier madium sheets comprise an arcuate magazine defining generally a quarter of a cylinder and constituting said rear end wall.

32. The copying machine as claimed in claim 31 in which the said magazine is removable.

33. In an electrostatic copying machine which includes a housing having top and bottom walls, side walls, a front wall and a rear wall; an imaging system within the housing including a rotary electrophotographic member, rotary means supporting the said electrophotographic member to rotate in a defined geometric endless path, drive means for moving said electrophotographic member in a predetermined direction along said path, means for charging progressive areas of the electrophotographic member, means for selectively discharging the electrophotographic member progressively to apply a latent image thereon and including means progressively illuminating and projecting the pattern of an original patterned member to the progressively charged areas of the electrophotographic member; means for toning the latent image progressively; means for progressively transferring the toned image to a carrier medium sheet moving synchronously with said electrophotographic member; and means for moving the sheet after transfer out of the front wall of the housing, the invention herein which comprises:

an arcuate carrier medium sheet storing magazine forming at least a part of said rear wall, said magazine having a generally vertically disposed entrance and a generally horizontally disposed discharge port and the chamber being smoothly curved from vertical to horizontal and arranged to hold a supply of carrier medium sheets in a curved disposition, said copying machine including means for stripping a carrier medium sheet from said magazine at the discharge port and moving said carrier medium sheet to said transferring means, said stripping and moving means being operatively coupled to said drive means.

34. The invention as claimed in claim 33 in which the electrophotographic member is a flexible belt, the rotary means comprise rollers and the defined geometric endless path is an oval loop around said rollers.

35. The invention as claimed in claim 33 or 34 in which the magazine is removable from said housing to provide access to the interior thereof.

36. The invention as claimed in claim 33 or 34 in which the magazine is removable from said housing to provide access to the interior thereof, and in which the stripping and moving means include at least a stripping roller cooperating with said magazine, the coupling between said drive means and at least said stripping roller being separable and the strippng roller being mounted to said magazine to be removable therewith.

37. The invention as claimed in claim 33 or 34 in which the magazine is removable from said housing to provide access to the interior thereof, in which the stripping and moving means include at least a stripping roller cooperating with said magazine, the coupling between said drive means and at least said stripping roller being separable and the stripping roller being mounted to the magazine to be removable therewith and in which, in addition to said stripping roller, said stripping and moving means include a pair of engaged synchronizing rollers adapted to synchronize movement of said sheet to said transferring means in synchronism with movement of said electrophotographic member, the coupling between said drive means and synchronizing rollers also being separable and the synchronizing rollers being mounted to said magazine and removable therewith.

38. The invention as claimed in claim 33 or 34 in which said magazine comprises a pair of spaced generally parallel arcuate walls forming between them an arcuate chamber extending between said entrance and discharge port, one arcuate wall having a larger radius of curvature than the other and comprising the outer arcuate wall.

39. The invention as claimed in claim 33 or 34 in which said magazine comprises a pair of spaced generally parallel arcuate walls forming between them an arcuate chamber extending between said entrance and discharge port, one arcuate wall having a larger radius of curvature than the other and comprising the outer arcuate wall, and in which the outer arcuate wall has at least a portion thereof pivotally mounted for swinging movement relative to the inner arcuate wall to provide wider access to said chamber than afforded by said entrance alone.

40. The invention as claimed in claim 34 in which said magazine has a vertical stop member at its discharge port which is substantially radial of the said cylinder, the discharge port being formed by said stop member and an opening in said magazine on the upper side thereof adjacent the bottom of said magazine.

41. The invention as claimed in claim 33 or 34 in which said magazine comprises a pair of spaced generally parallel arcuate walls forming between them an arcuate chamber extending between said entrance and discharge port, one arcuate wall having a larger radius of curvature than the other and comprising the outer arcuate wall, and in which said magazine has stop means at the bottom of the magazine blocking the chamber and the inner arcuate wall terminates short of said stop means, the resulting opening comprising said discharge port.

42. The invention as claimed in claim 33 or 34 in which said magazne comprises a pair of spaced generally parallel arcuate walls forming between them an arcuate chamber extending between the said entrance and discharge port, one arcuate wall having a larger radius of curvature than the other and comprising the outer arcuate wall, in which said magazine has stop means at the bottom of the magazine blocking the chamber and adapted to be engaged by the front edges of sheets in said magazine and the inner arcuate wall has a slot adjacent said stop means, said slot comprising said discharge port, and in which at least a portion of the outer arcuate wall at the bottom of the magazine opposite the discharge port is swingable, means being provided for biasing said portion upward to force the bottom end of a supply of sheets in said chamber to move toward said discharge port.

43. The invention as claimed in claim 33 or 34 in which said magazine comprises a pair of spaced generally parallel arcuate walls forming between them an arcuate chamber extending between the entrance and discharge port, one arcuate wall having a larger radius of curvature than the other and comprising the outer arcuate wall, in which said magazine has a stop means at the bottom of the magazine blocking the chamber and adapted to be engaged by the front edges of sheets in said magazine and the inner arcuate wall has a slot adjacent said stop means, said slot comprising said discharge port, in which at least a portion of the outer arcuate wall at the bottom of the magazine opposite the discharge port is swingable, means being provided for biasing said portion upward to force the bottom end of a supply of sheets in the chamber to move toward said discharge port, and in which said stripping and moving means comprise a roller disposed at said discharge port and the biasing means will move said bottom end of said supply of sheets against said roller.

44. The invention as claimed in claim 33 or 34 in which said magazine comprises a pair of spaced generally parallel arcuate walls forming between them an arcuate chamber extending between said entrance and discharge port, one arcuate wall having a larger radius of curvature than the other and comprising the outer arcuate wall, in which the outer arcuate wall has at least a portion thereof pivotally mounted for swinging outwad relative to the inner arcuate wall to provide wider access to said chamber than afforded by said entrance alone, in which said chamber has stop means at its bottom end to position the forward edges of a supply of said sheets when in said chamber, in which the said discharge port comprises a slot extending across the magazine in the inner arcuate wall adjacent said stop means, and in which means are provided for pressing said forward end of a supply of sheets upward toward said slot.

45. The invention as claimed in claim 33 or 34 in which said magazine comprises a pair of spaced generally parallel arcuate walls forming betwen them an arcuate chamber extending between said entrance and discharge port, one arcuate wall having a larger radius of curvature than the other and comprising the outer arcuate wall, in which the outer arcuate wall has at least the upper portion thereof adjacent the entrance pivotally mounted for swinging outward relative to the inner arcuate wall to provide wider access to said chamber than afforded by said entrance before swinging said upper portion, in which said chamber has stop means at its bottom end to position the forward edges of a supply of said sheets when in said chamber, in which the discharge port comprises a passageway in the inner arcuate wall adjacent said stop means, in which bias means are provided for raising the lower end of said outer arcuate wall to press the forward ends of said supply of sheets to move out of said discharge port, and in which the said lower end of said outer arcuate wall is coupled with said upper portion of the outer arcuate wall in a linkage which lowers the lower end of the arcuate wall against the raising action of the bias means when the said upper portion of the outer arcuate wall is swung outward.

46. The invention as claimed in claim 33 or 34 in which all if not a portion of the imaging system and toning means are disposed within the geometric figure subtended by the interior curvature of said magazine.

47. A table top electrostatic copying machine comprising:
  A. a housing for said machine having at least a base and a top wall,
  B. an imaging system within the housing an including
   i. a flexible endless belt with an electrophotographic outer surface mounted on at least a pair of spaced rollers, one of said rollers being driven and there being drive means for rotating the belt coupled to said one roller and the belt reaches both extending in one general direction away from said one roller toward a second roller, the upper reach moving toward said one roller,
   ii. a charging station including a corona generating device arranged adjacent the upper reach of said belt close to said one roller for applying a charge potential to said belt surface and
   iii. a latent image producing station at said one roller immediately following the charging station in the direction of movement of said belt and including a light band projecting system for applying a band of projected subject matter light to said belt transversely of said belt while said belt passes around and is engaged with the upper portion of said one roller selectively to discharge said charge potential and progressively forming thereby a latent image on said belt surface,
  C. said top wall of the housing having an illuminating station for receiving a document or the like patterned original and progressively moving said document through said illuminating station and said last-mentioned station including
   i. document transporting means coupled to said drive means for moving said document through and out of said illuminating station in synchronism with said belt movement,
   ii. a light transmitting platen optically coupled to said light band projecting system through said top wall, the document transporting means being arranged to move the document face down through said illuminating station with at least strips of the subject matter thereof in engagement with said platen progressively as the document so moves,
   iii. illuminating means for illuminating that portion of the document in engagement with said platen and
   iv. means shielding the illumination produced by said illuminating means from said belt,
  D. a development station within the housing and disposed adjacent said one roller opposite the side of said roller from which said belt reaches extend, said development station having means for applying toner to said latent image as said latent image passes around said one roller on said belt, the resulting developed image being progressively produced on said belt surface and passing therewith around the bottom of said one roller and along the bottom reach of said belt toward the second of said pair of rollers,
  E. a carrier medium transfer station adjacent said second roller and arranged to transfer the developed image progressively to a sheet of carrier medium moving in synchronism with said lower reach of said belt relative to said second roller,
  F. a magazine having an entrance and a discharge port for holding a supply of sheets of carrier medium, said magazine closing off one end of said housing and having the general configuration of a quadrant of a cylinder whose axis is in the interior of the housing, the top and entrance of the magazine being located at about the level of said top wall and at said one end of the housing and the bottom and discharge port of the magazine being located at about the said base and spaced inwardly of said one end such that substantially no part of said magazine extends beyond the vertical plane defined by said one end of said housing,
  G. means for stripping a sheet of carrier medium from said supply at said discharge port and moving said sheet out of said magazine toward said transfer station,
  H. means for moving the carrier medium sheet from the transfer station after said developed image has been transferred thereto through the second end of said housing opposite said first end and
  I. at least said one roller, development station, stripping means and a substantial portion of the said illuminatng station being located within the cylindrical quadrant defined by said magazine whereby to limit the exterior dimensions of said housing.

48. The copying machine as claimed in claim 47 in which toner fixing means are associated with said moving means between said transfer station and the second end of said housing.

49. The invention as claimed in claim 33 in which the magazine is in the form of a quadrant of a cylinder.

* * * * *